(12) United States Patent
Perri (10) Patent No.: US 7,905,507 B2
(45) Date of Patent: Mar. 15, 2011

(54) TRAILER REVERSAL SELF-CORRECTING ASSEMBLY

(76) Inventor: Ottavio Perri, Alexandria (AU)

(*) Notice: Subject to any disclaimer, the term of this patent is extended or adjusted under 35 U.S.C. 154(b) by 665 days.

(21) Appl. No.: 11/597,255

(22) PCT Filed: May 20, 2005

(86) PCT No.: PCT/AU2005/000727
§ 371 (c)(1),
(2), (4) Date: Feb. 12, 2008

(87) PCT Pub. No.: WO2005/113265
PCT Pub. Date: Dec. 1, 2005

(65) Prior Publication Data
US 2008/0217884 A1    Sep. 11, 2008

(30) Foreign Application Priority Data

May 21, 2004 (AU) ............................... 2004902766
Oct. 18, 2004 (AU) ............................... 2004905998

(51) Int. Cl.
  *B60D 1/34* (2006.01)
(52) U.S. Cl. ................ 280/455.1; 280/456.1; 280/460.1
(58) Field of Classification Search ............... 280/455.1, 280/456.1, 459, 460.1
See application file for complete search history.

(56) References Cited

U.S. PATENT DOCUMENTS

| | | | |
|---|---|---|---|
| 3,697,099 A * | 10/1972 | Potts et al. | 280/455.1 |
| 4,106,794 A | 8/1978 | Sallis | |
| 4,133,552 A * | 1/1979 | Sheine | 280/455.1 |
| 4,582,337 A * | 4/1986 | Hsueh | 280/455.1 |
| 4,681,335 A | 7/1987 | Ledermann et al. | |
| 4,949,987 A * | 8/1990 | Gallatin | 280/459 |
| 6,283,489 B1 * | 9/2001 | Hoog | 280/455.1 |
| 6,485,046 B1 * | 11/2002 | Hsueh et al. | 280/455.1 |
| 7,354,056 B2 * | 4/2008 | Namuduri et al. | 280/455.1 |
| 7,422,226 B2 * | 9/2008 | Hsueh | 280/455.1 |

FOREIGN PATENT DOCUMENTS

| | | |
|---|---|---|
| DE | 2711133 A1 | 3/1978 |
| DE | 3149700 A1 | 8/1982 |
| EP | 0446614 A2 | 9/1991 |
| EP | 1215105 A2 | 6/2002 |
| EP | 05 74 2124 | 7/2010 |
| GB | 2320473 | 6/1998 |
| WO | WO 93/16909 A1 | 9/1993 |

* cited by examiner

*Primary Examiner* — Kevin Hurley
(74) *Attorney, Agent, or Firm* — Daniel B. Schein, Esq.

(57) ABSTRACT

A trailer reversal self-correcting assembly (10) adapted to be disposed between the tow bar (12) of a vehicle (14) and the tow member (16) of a trailer (18), the assembly (10) comprising a tow arm (20) pivotally connected to the tow bar (12) at its first end and to the tow member (16) at its second end, a first extension mount (26) extending laterally from the tow bar (12), and a second extension mount (30) extending laterally from the tow member (16), a first correcting linkage device having at least a first linkage member (38) connected between the first extension mount (26) and the second extension mount (30).

12 Claims, 14 Drawing Sheets

TRAILER REVERSAL SELF-CORRECTING ASSEMBLY

TECHNICAL FIELD

The present invention relates to a trailer reversal self-correcting assembly.

BACKGROUND

The reversal of a trailer towed by a vehicle in a desired straight line followed by the vehicle is often achieved with difficulty, even by experienced drivers who may over compensate or under compensate in their steering of the vehicle in the reverse direction and cause skewing or, at worse, a jack-knifing of the trailer with respect to the vehicle. This requires that the driver make many steering adjustments to maintain the trailer reversal in the desired straight line.

It is an object of the present invention to provide a trailer reversal self-correcting assembly that will overcome, or at least substantially ameliorate, the aforementioned problem of the prior art.

SUMMARY OF INVENTION

According to a first aspect of the present invention there is provided a trailer reversal self correcting assembly adapted to be disposed between the tow bar of a vehicle and the tow member of a trailer, said assembly comprising:
(a) a tow arm pivotally connected at or near its first end to said tow bar at a first pivot connection and also pivotally connected at or near its second end to said tow member at a second pivot connection, said second pivot connection lies on a first axis of said tow member;
(b) a first extension mount extends laterally from said tow bar and a second extension mount extends laterally from said tow member to the same side as the first extension mount;
(c) a first correcting linkage device having at least a first linkage member connected between said first extension mount at a third pivot connection and said second extension mount via a fourth pivot connection, said third pivot connection lies on a second axis that intersects with said first axis at a location behind said tow arm.

Preferably upon reversal of said trailer by said vehicle, movement of said trailer away from a straight line followed by the vehicle is self-corrected by forces applied by said first correcting linkage device on the linkage provided by said tow arm.

Preferably in one embodiment a third extension mount extends laterally from said tow bar opposite said first extension mount, and a fourth extension mount extends laterally from said tow member to the same side as the third extension mount, and a second correcting linkage device having at least a second linkage member is connected between said third extension mount at a fifth pivot connection and said fourth extension mount via a sixth pivot connection, said fifth pivot connection lies on a third axis that intersects with said first axis at a location behind said tow arm. Preferably upon reversal of said trailer by said vehicle, movement of said trailer away from a straight line followed by the vehicle is self-corrected by forces applied by said first and second correcting linkage devices upon each other.

Preferably an axle of said trailer is disposed between said tow arm and the intersection of said first axis and said second axis. Preferably an axle of said trailer is disposed between said tow arm and the intersection of said first axis and said third axis.

Preferably in another embodiment said first correcting linkage device and or said second correcting linkage device comprise a plurality of linkage members.

Preferably said first correcting linkage member is length adjustable.

Preferably said first correcting linkage member is a pneumatic strut.

Preferably said pivot connections are pivot bolt and nut arrangements.

In another embodiment said assembly is provided with a powered drive unit and/or powered actuators to assist said trailer to be self corrected when said trailer moves away from a straight line followed by said vehicle.

According to a second aspect of the present invention there is provided a trailer reversal self correcting assembly adapted to be disposed between the tow bar of a vehicle and the tow member of a trailer, said assembly comprising a tow arm pivotally connected to said tow bar at a first pivot connection and also pivotally connected to said tow member at a second pivot connection, and wherein movement of said trailer away from a straight line followed by the vehicle is self corrected by forces imposed by said assembly.

Preferably in addition to said tow arm, said assembly comprises a linkage device pivotally connected to said tow bar via a third pivot connection and also pivotally connected to said tow member via a fourth pivot connection.

Preferably said second pivot connection lies on a first axis of said tow member, and said third pivot connection lies on a second axis that intersects with said first axis at a point or line behind said tow arm.

Preferably an axle of said trailer is disposed between said tow arm and the intersection of said first axis and said second axis.

Preferably in one embodiment said linkage device comprises a rotatable shaft supported by a shaft guide mounted on said tow arm, and said third and fourth pivot connections each comprise a mesh connection.

Preferably said third pivot connection is a crown wheel and pinion connection.

Preferably said fourth pivot connection is a rack and pinion connection.

Preferably in another embodiment said first pivot connection is at or near a first end of said tow arm and said second pivot connection is disposed between said first pivot connection and a second end of said tow arm, and a powered actuator mounted to said trailer is adapted to actuate said tow arm.

Preferably a switch mechanism is adapted to detect movement of said trailer away from said straight line followed by said vehicle and activate said powered actuator in response thereto.

Preferably said assembly is provided with a powered drive unit and/or powered actuator to assist said trailer to be self-corrected when said trailer moves away from a straight line followed by said vehicle.

BRIEF DESCRIPTION OF THE DRAWINGS

In order that the invention may be readily understood and put into practical effect, reference will now be made to the accompanying drawings, in which:—

MODE OF CARRYING OUT INVENTION

Figure 1:
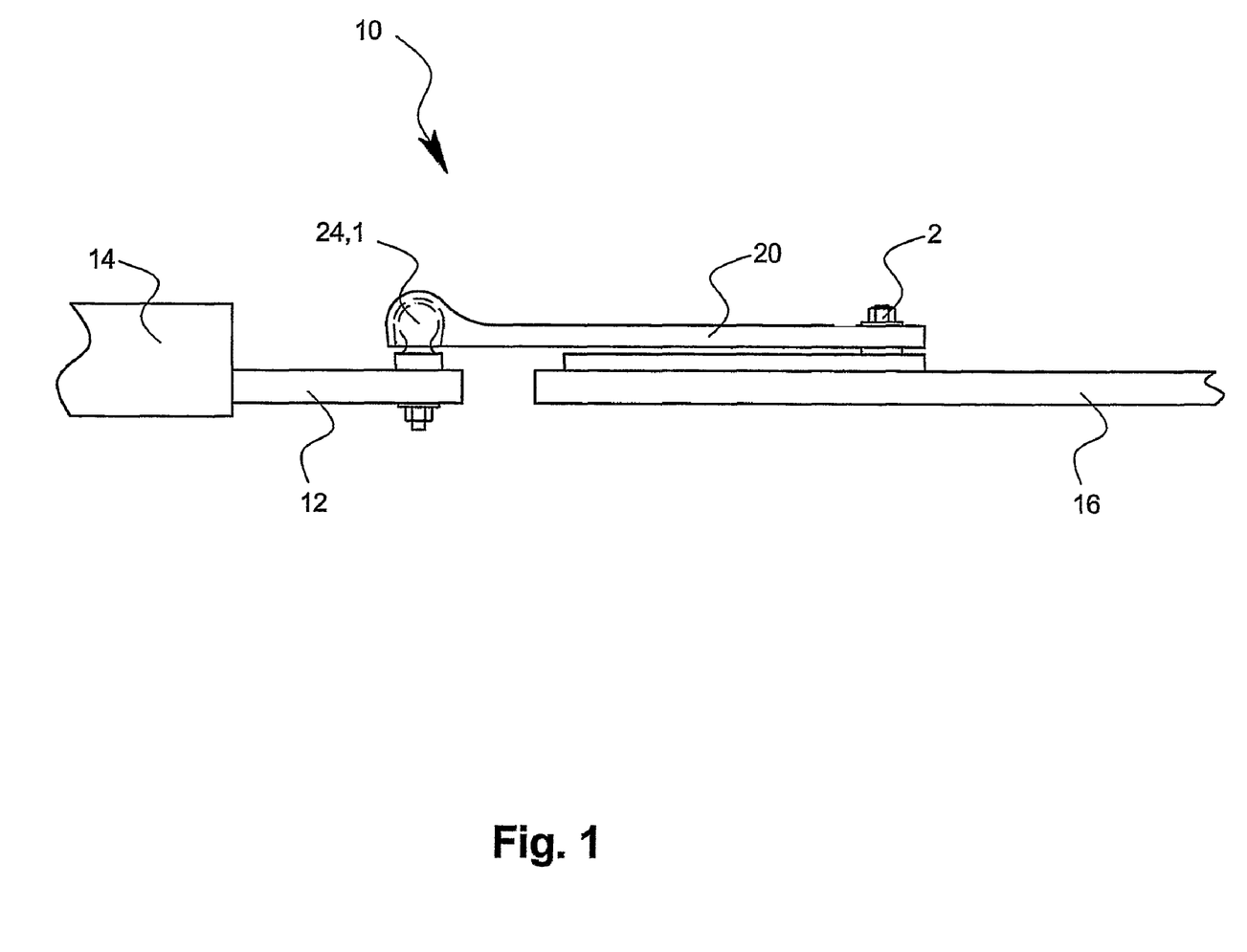
FIG. 1 is an elevation view of a first embodiment of a trailer reversal self-correcting assembly of the present invention.
Figure 2:
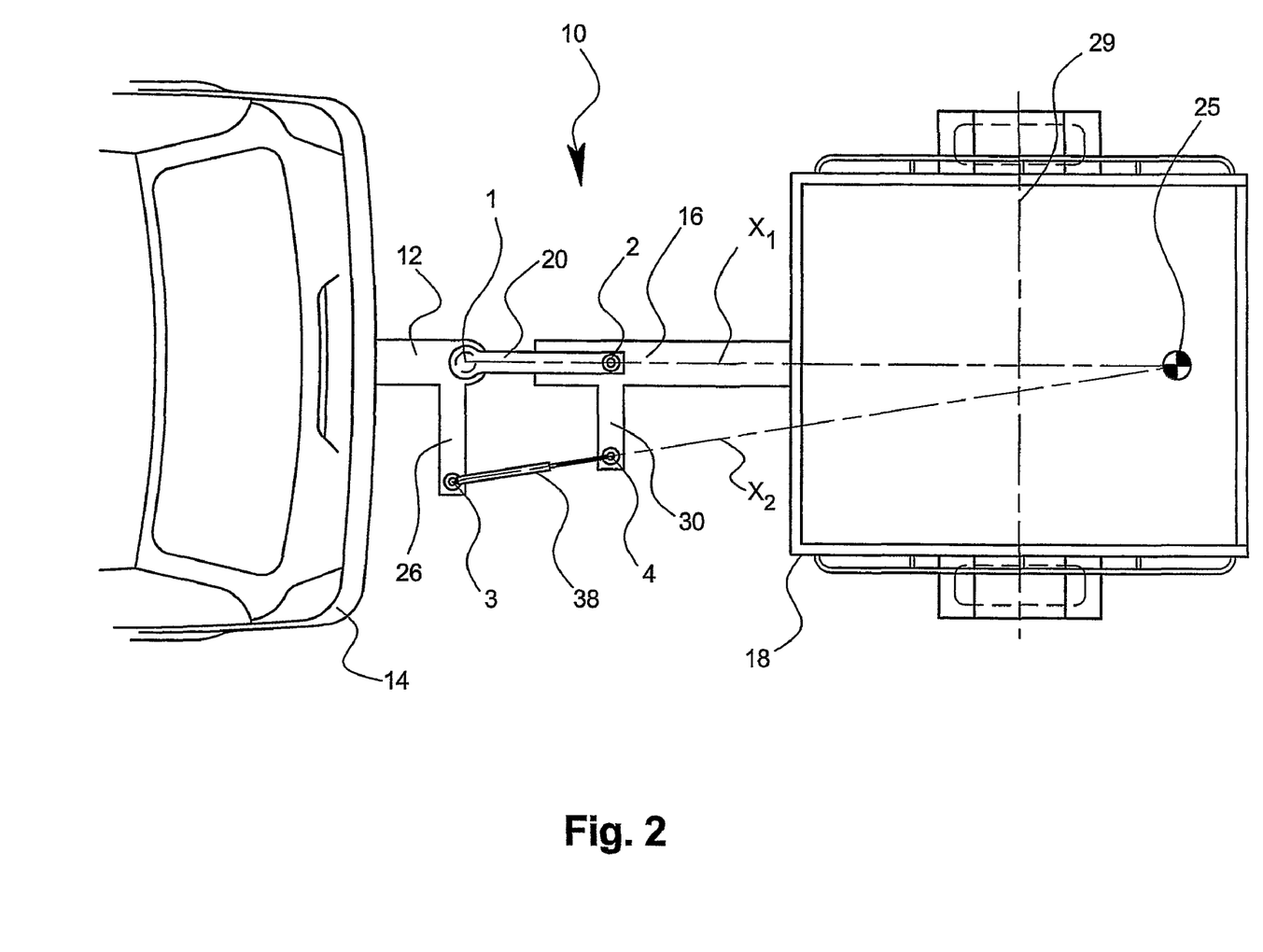
FIG. 2 is a plan view of the assembly of FIG. 1 when the trailer is being reversed by a vehicle in a straight line followed by the vehicle.
Figure 3:
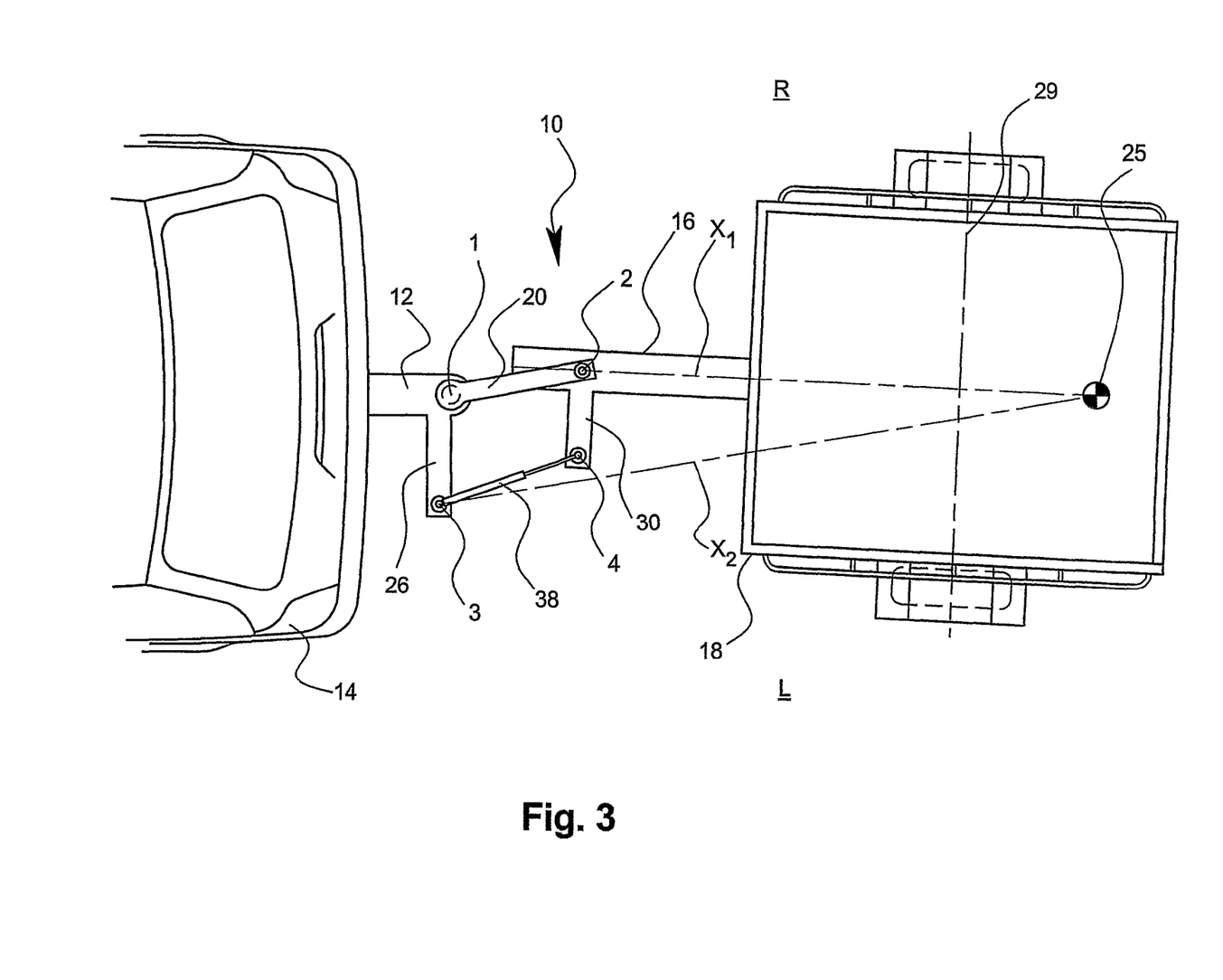
FIG. 3 is a similar view of the assembly shown in FIG. 2 showing that the trailer is skewed away from a straight line to be followed by the vehicle, which skewing will be self-corrected upon reversal of the trailer by the vehicle in a straight line.

FIGS. 1 to 3 depict a trailer reversal self-correcting assembly 10 in accordance with a first embodiment of the present invention. The assembly 10 is adapted to be disposed between the tow bar 12 of a vehicle 14 and the tow member 16 of a trailer 18.

The assembly 10 comprises a tow arm 20, extension mounts 26, 30 and correcting linkage member 38. Extension mount 26 extends laterally from tow bar 12, whilst extension mount 30 extends laterally from the tow member 16 of trailer 18.

Tow arm 20 is pivotally connected at one end to tow ball 24 of tow bar 12 thus forming pivot connection 1. The other end of tow arm 20 is pivotally connected to tow member 16 of trailer 18, thus forming pivot connection 2.

One end of correcting linkage member 38 is pivotally connected to extension mount 26 near its free end thus forming pivot connection 3. The other end of correcting linkage member 38 is pivotally connected to extension mount 30 near its free end, thus forming pivot connection 4.

Tow arm 20 and correcting linkage member 38 are inclined to each other, such that an axis $X_1$ of tow member 16 passing through pivot connections 1 and 2 as shown in FIG. 2, is inclined to an axis $X_2$ of correcting linkage member 38 passing through pivot connections 3 and 4. This is achieved as the extension mount 26 extends laterally further from tow bar 12 than extension mount 30 extends from tow member 16. Thus the distance between pivot connection 1 and pivot connection 3 is greater than the distance between pivot connection 2 and pivot connection 4. The axis $X_1$ and axis $X_2$ intersect at a point (or line) 25 located behind tow arm 20. The axle (or wheel) axis 29 of trailer 18 is disposed between point (or line) 25 and tow arm 20. In this embodiment the axes $X_1$ and $X_2$ are assumed to be in the same horizontal plane, and therefore intersect at a point 25. It should be understood where axes $X_1$ and $X_2$ are in spaced apart horizontal planes their intersection would occur on a vertical line.

The pivot connection 1 between the tow ball 24 and tow arm 20 is a conventional trailer-tow ball connection. The pivot connections 2,3 and 4 may be pivot bolt and nut arrangements.

In use, as trailer 18 is being reversed, and begins to skew or veer off to one side, the extension mount 30 acts on the correcting linkage member 38, which either pulls or pushes relative to which way the trailer 18 veers. In this case, it will be assumed the trailer 18 is veering to the left L as shown in FIG. 3. As can be seen in FIG. 3 axis $X_1$ of tow member 12 no longer passes through pivot connection 1. As this occurs, the angle of trailer 18 is changing relative to vehicle 14, and therefore relative to extension mount 26. As a result, a force acts on correcting linkage member 38 via extension mount 26, and the only avenue for the reaction to the force on correcting linkage member 38 is for the tow arm 20, and hence the extension mount 30 on tow member 16, to move on its pivot connection 2 to the left by some degrees, thereby changing the line of angle of trailer 18, relative to vehicle 14. Where the line of direction of trailer 14 was once angled to the left, it is now forced to the right R, and so the trailer 18 will be brought back in line with the vehicle 14 as subsequent reversing occurs. As the trailer 18 is coming into line with vehicle 14, the opposite action will occur with correcting linkage member 38, tow arm 20 and extension mount 30 all aligning the trailer 18 with the vehicle 14.

More generally, it is observed by the present inventor that, upon reversal of the trailer 18 by the vehicle 14 any movement of the trailer 18 away from a straight line followed by the vehicle 14 is self-corrected by forces applied by correcting linkage member 38 on tow arm 20.

In the above-described embodiment the correcting linkage member 38 is a "pneumatic strut" whose overall length is variable to some extent. It should be understood that the correcting linkage member 38 need not be a strut for assembly 10 to achieve self-correction of the skewed trailer, and may for instance in other embodiments be a single piece member. However, it is preferred to use a length variable pneumatic strut as correcting linkage member 38, to avoid the assembly 10 locking up during normal driving conditions.

Figure 4:
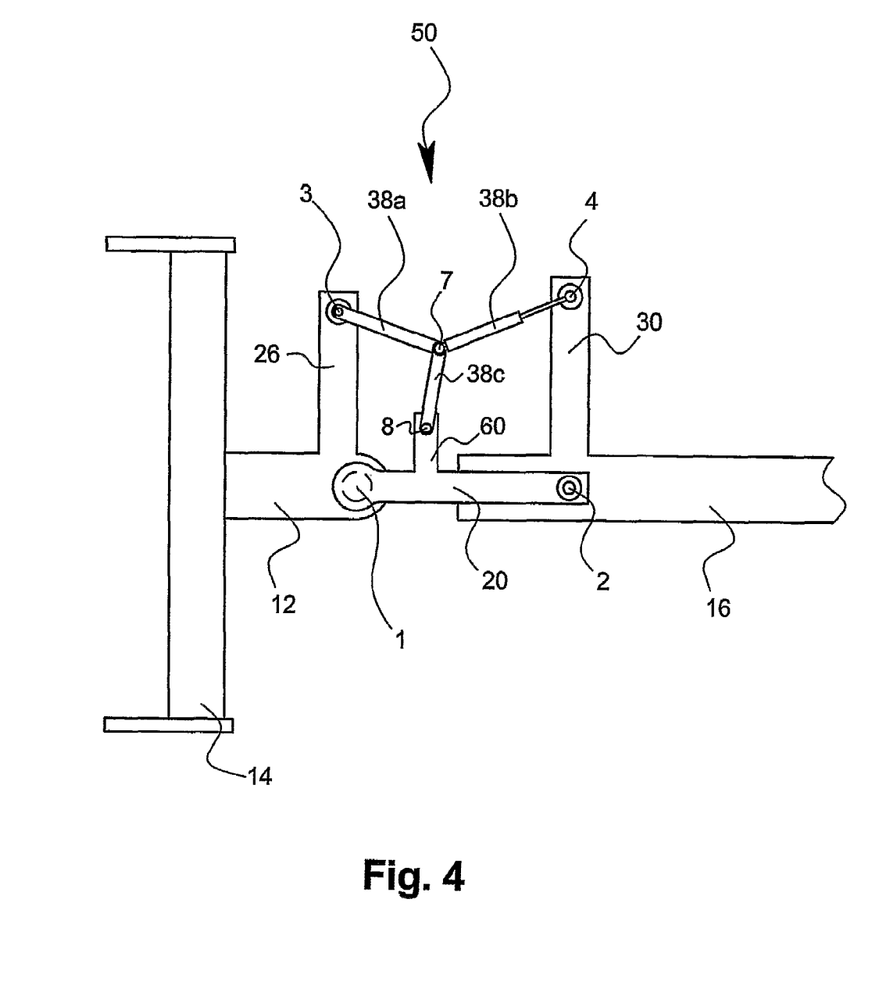
FIG. 4 is a plan view of a second embodiment of a trailer reversal self-correcting assembly of the present invention when the trailer is being reversed by a vehicle in a straight line followed by the vehicle.
Figure 5:
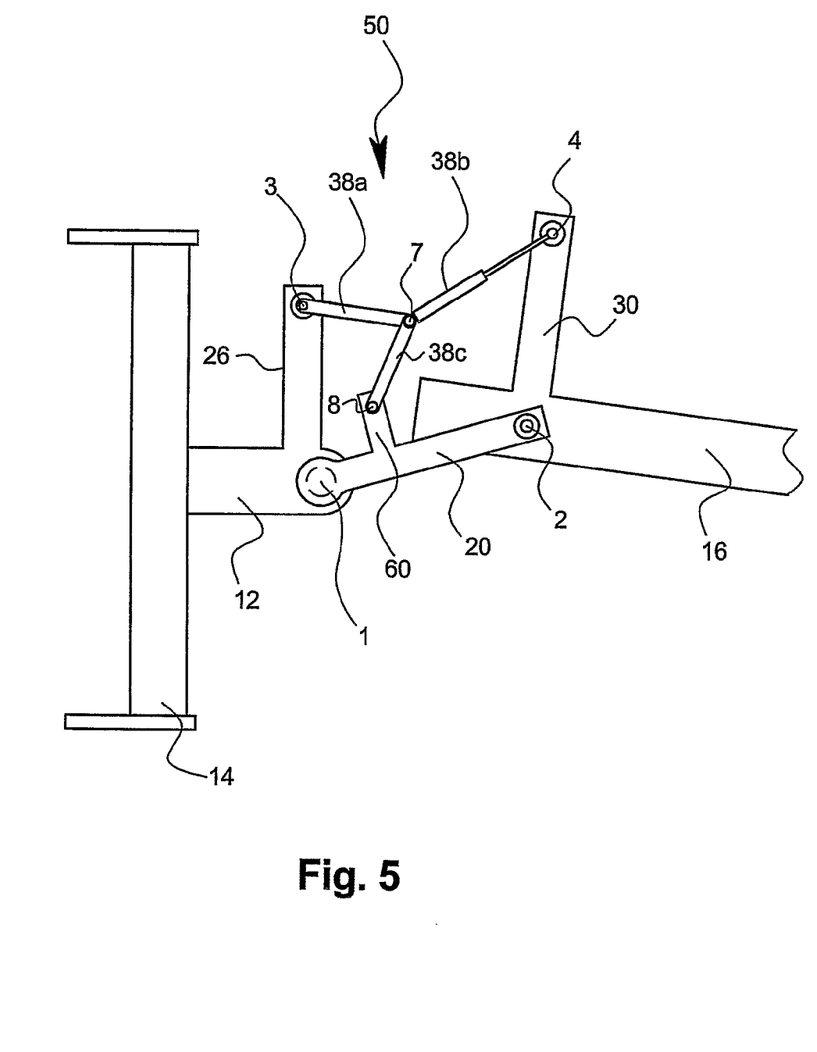
FIG. 5 is a similar view of the assembly shown in FIG. 4 showing that the trailer is skewed away from a straight line to be followed by the vehicle, which skewing will be self-corrected upon reversal of the trailer by the vehicle in a straight line.

FIGS. 4 and 5 depict a trailer reversal self-correcting assembly 50 in accordance with a second embodiment of the present invention. The assembly 50 has many similar features to the assembly 10 of the first embodiment (and so similar features in FIGS. 4 and 5 will be accorded the same reference numerals as those accorded in FIGS. 1 to 3). The assembly 50, like that of assembly 10 of the first embodiment has a tow arm 20 disposed between the tow bar 12 of a vehicle 14 and the tow member 16 of a trailer 18. This embodiment differs from the first embodiment, in that the single correcting linkage member 38 is replaced by three correcting linkage members 38a, 38b and 38c that collectively will be referred to as a "correcting linkage device". Each of the correcting linkage members 38a, 38b and 38c have a free end pivotally connected to each other at pivot connection 7. The other end of correcting linkage member 38a is pivotally connected to extension mount 26 at pivot connection 3. The other end of correcting linkage member 38b is pivotally connected to an extension mount 30 at pivot connection 4. The other end of correcting linkage member 38c is connected to an extension mount 60 that extends from tow arm 20, thus forming pivot connection 8. The correcting linkage member 38b is a pneumatic strut that is length variable, like correcting linkage member 38 of the first embodiment.

Also, like that of correcting linkage member 38 of the first embodiment, the correcting linkage member 38a is inclined relative to tow arm 20 and tow member 16 as shown in FIG. 4, such that an axis of tow arm 16 passes through pivot connection 1 and 2 and is inclined to an axis passing through pivot connection 3 and 7. Like that of the first embodiment, these axes would intersect at a point (or line) behind the axle of the trailer.

In use as the trailer is being reversed, and begins to skew or veer off to one side as shown in FIG. 5, the correcting linkage member 38a pivotally connected to extension mount 26 acts on the correcting linkage members 38b and 38c at their interconnecting pivot connection 7. This in turn has the effect of spreading apart the tow arm 20 and extension mount 30. As this occurs, the trailer 18 changes its line of direction so as to return back in line with vehicle 14 as further reversing occurs.

Figure 6:
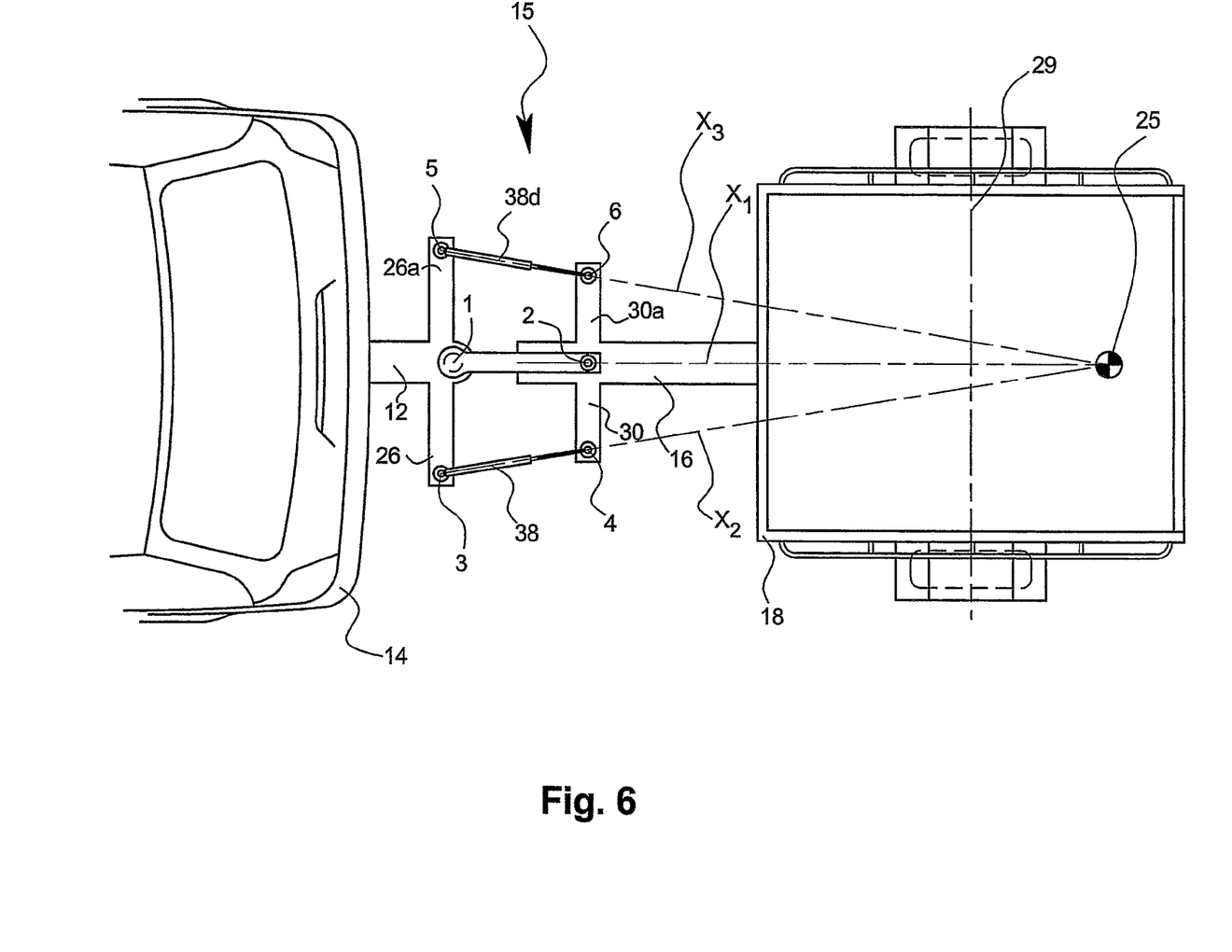
FIG. 6 is a plan view of a third embodiment of a trailer reversal self-correcting assembly of the present invention.
Figure 7:
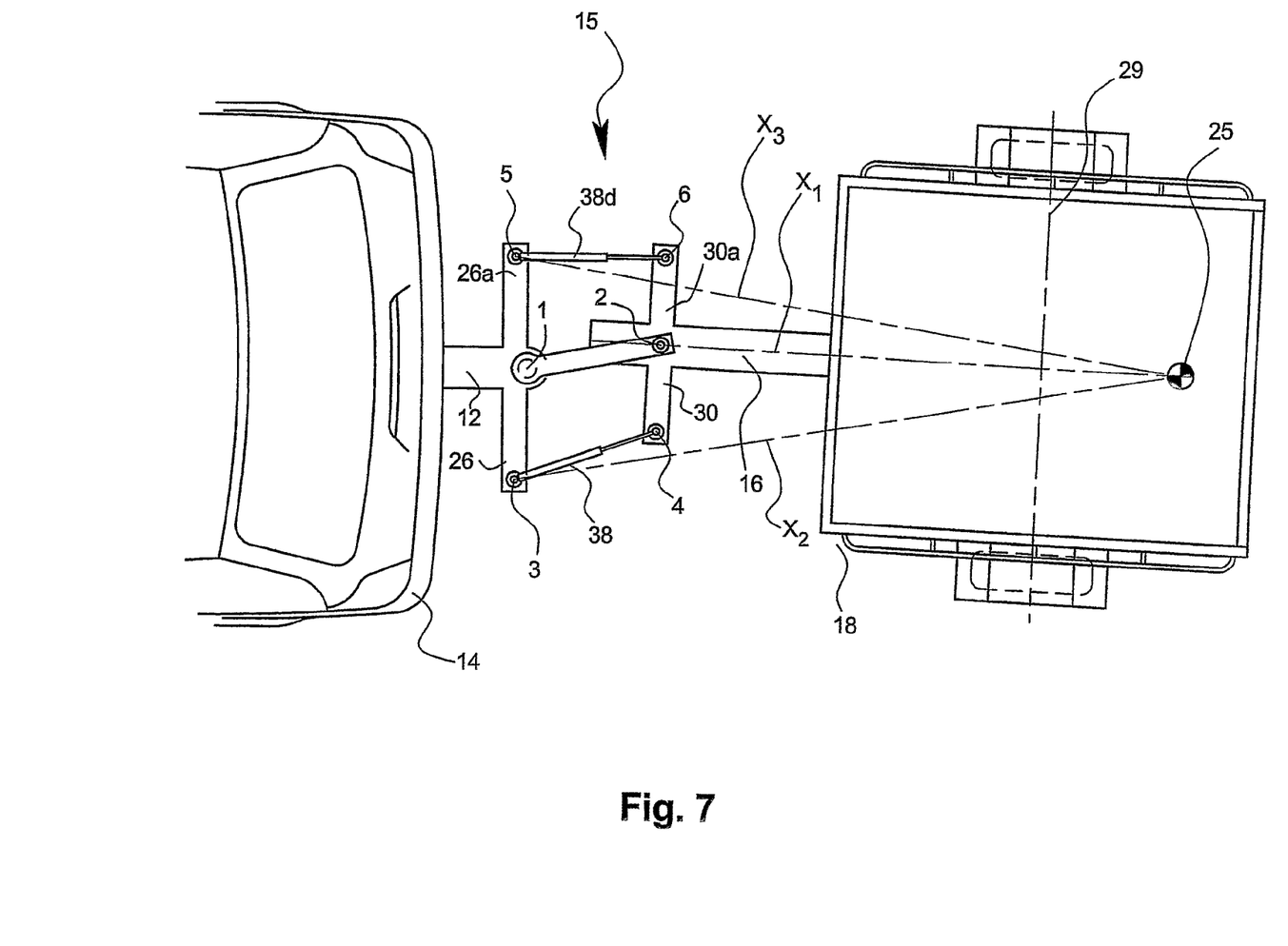
FIG. 7 is a similar view of the assembly shown in FIG. 6 showing that the trailer is skewed away from a straight line to be followed by the vehicle, which skewing will be self-corrected upon reversal of the trailer by the vehicle in a straight line.

FIGS. 6 and 7 depict a third embodiment of an assembly 15 which is similar to the first embodiment of FIGS. 1-3, however, it has a third extension mount 26a extending from tow arm 12, a fourth extension mount 30a extending from tow member 16 and correcting linkage member 38d pivotally connected between pivot connection 5 on extension mount 26a and pivot connection 6 on extension mount 30a. In such an embodiment as trailer 18 is being reversed and begins to skew or veer off to the left as shown in FIG. 7, the angle of trailer 18 is changing relative to vehicle 14.

Like that of the first embodiment, this embodiment has axes $X_1$ and $X_2$, but also has an axis $X_3$ as shown in FIG. 6. All three of these axes intersect at a point (or line) 25. The axle (or wheel) axis 29 of the trailer 18 is disposed between point (or line) 25 and tow arm 20. As can be seen in FIG. 7, when the trailer skews or veers off to the left the axes $X_1$, $X_2$ and $X_3$ have shifted. In such an embodiment, when the trailer 18 is reversed, movement of trailer 18 away from a straight line followed by the vehicle is self corrected by forces applied by the first linkage device (linkage member 38) and the second linkage device (linkage member 38d) upon each other.

Figure 8:
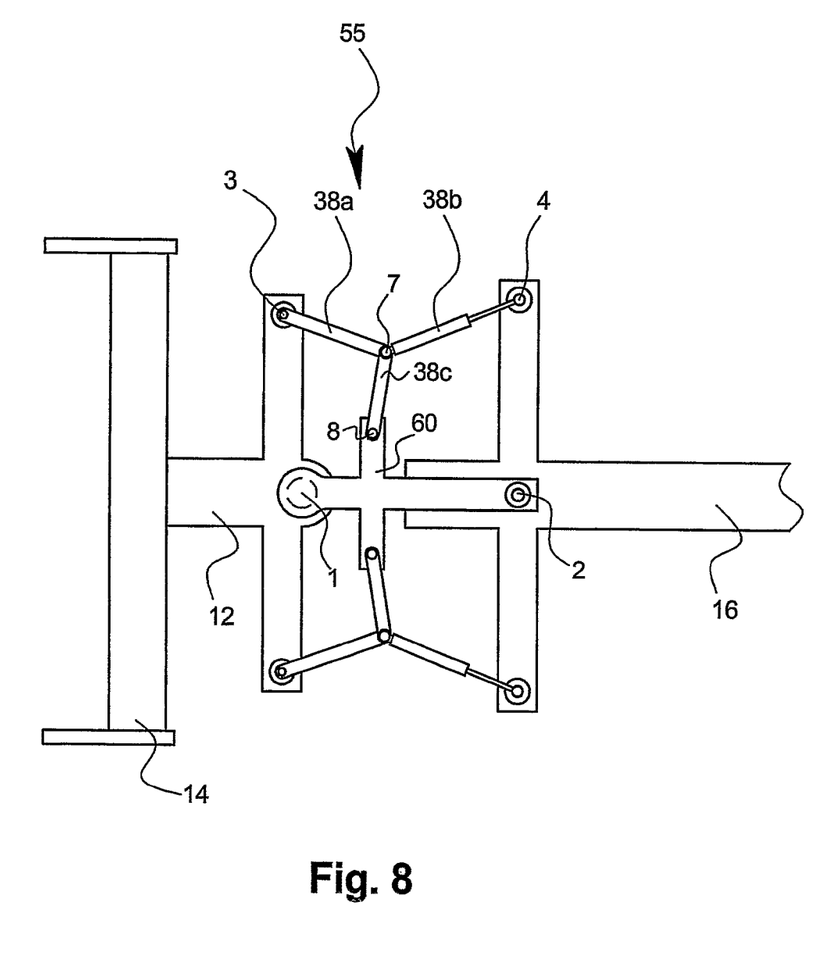
FIG. 8 is a plan view of a fourth embodiment of a trailer reversal self-correcting assembly of the present invention.

In another fourth embodiment that is similar to the third embodiment, a plurality of linkage members and extension mounts can be used, as shown in FIG. 8.

It should be understood that in other not shown embodiments, the forces imposed by the linkage members on each other and the tow arm to self-correct the movement of the trailer may be assisted by powered drive units or actuators that are powered from a source on the vehicle, or alternatively from a separate power source, such as a rechargeable battery fitted to the trailer. The activation of the powered drive units and actuators may be controlled by switches operably connected to the linkage members.

Figure 9:
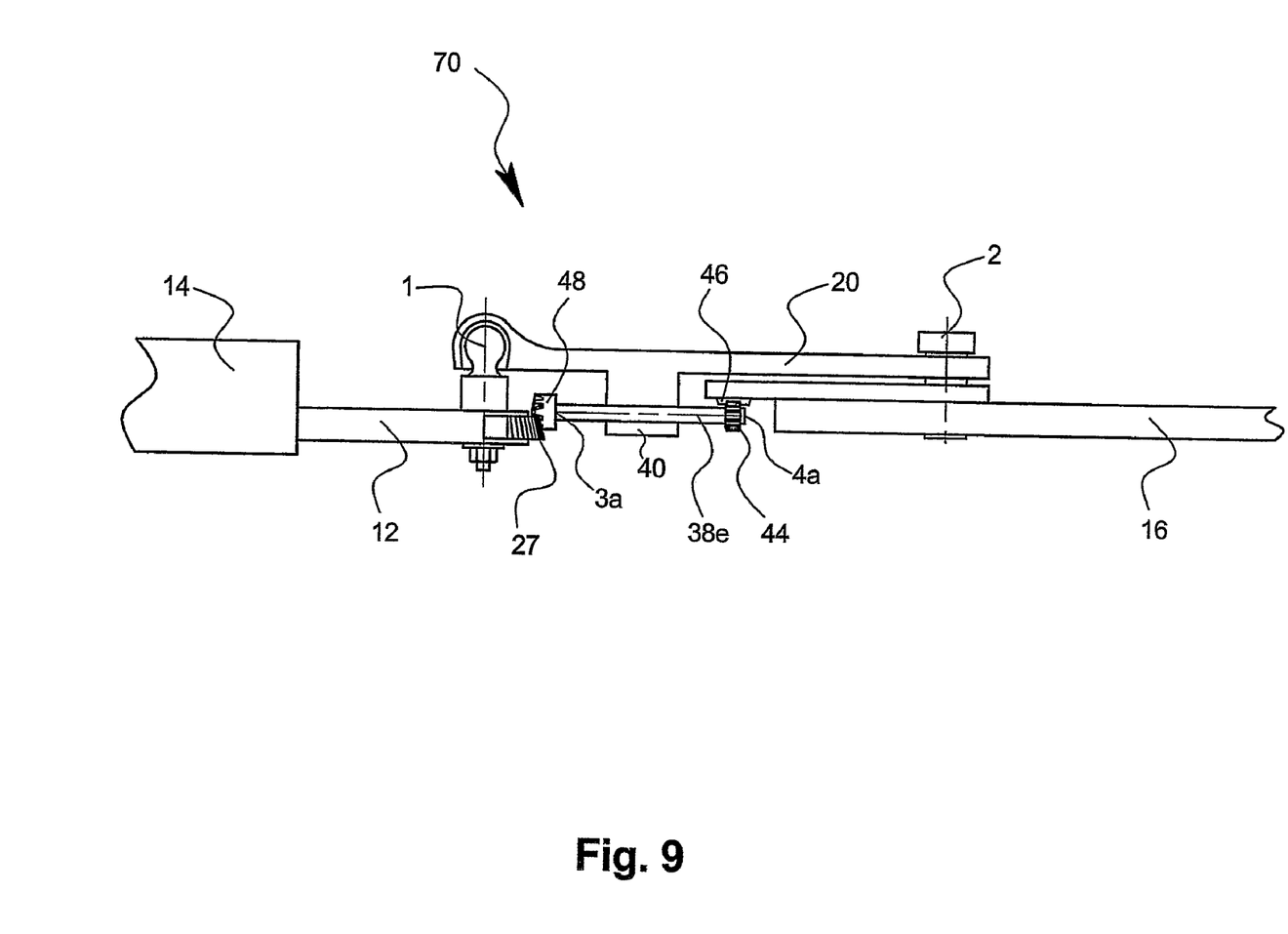
FIG. 9 is an elevation view of a fifth embodiment of a trailer reversal self-correcting assembly of the present invention.
Figure 10:
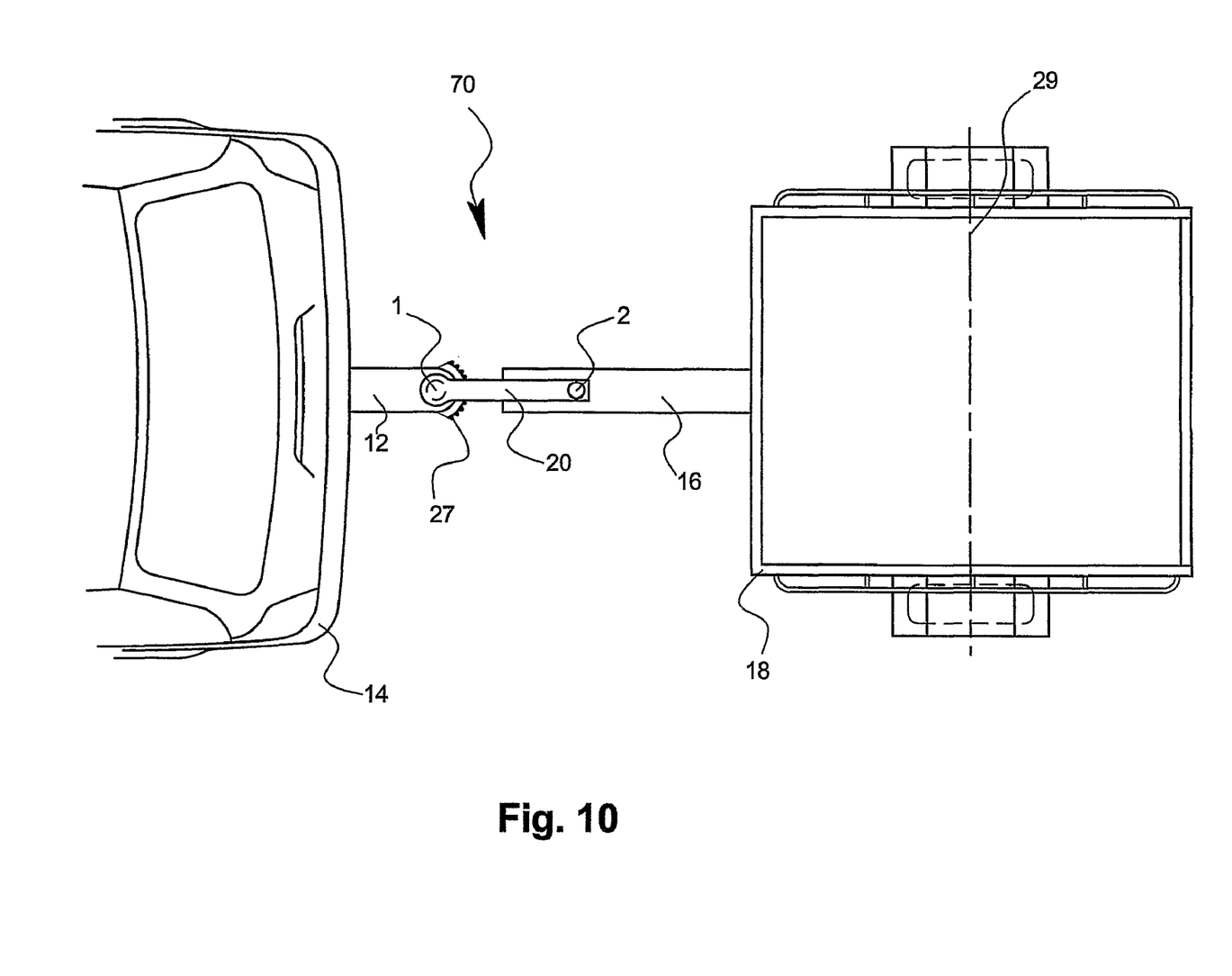
FIG. 10 is a plan view of the assembly shown in FIG. 9 when the trailer is being reversed in a straight line followed by the vehicle.
Figure 11:
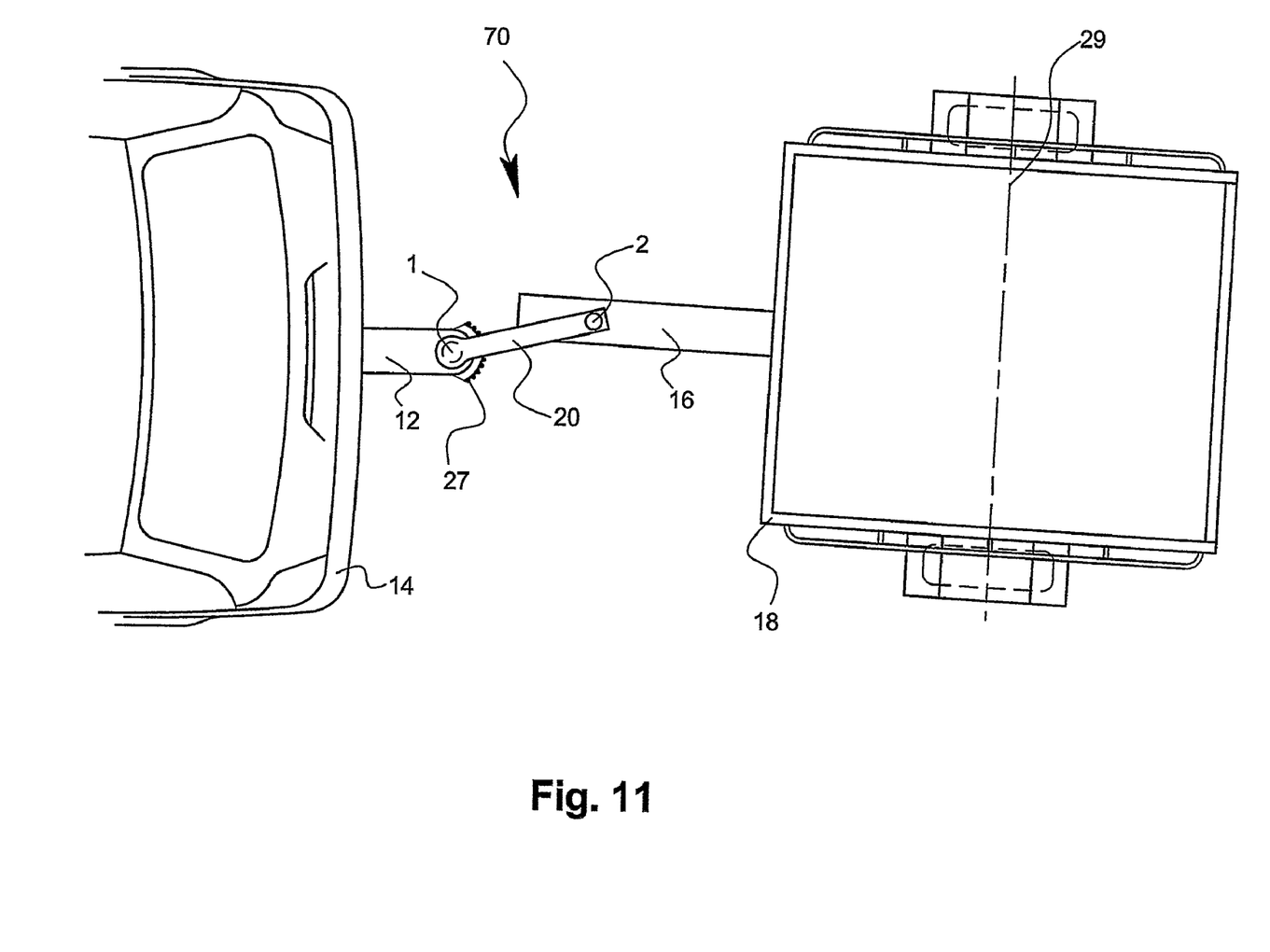
FIG. 11 is a similar view of the assembly shown in FIG. 10 when the trailer is skewed away from a straight line to be followed by the vehicle, which skewing will be self corrected by reversal of the trailer by the vehicle by reversal in a straight line.

FIGS. 9-11 depict a trailer reversal self-correcting assembly 70 of the present invention in a fifth embodiment. The assembly 70 has many similar features to assembly 10 of the first embodiment (and so similar features in FIGS. 9-11 will be accorded the same reference numerals as those accorded in FIGS. 1-3). The assembly 70, like that of assembly 10, has a tow arm 20 disposed between the tow bar 12 of vehicle 14 and the tow member 16 of a trailer. This embodiment differs from the first embodiment, in that the correcting linkage member 38 is replaced by a rotatable linkage shaft 38e.

The rotatable linkage shaft 38e is supported by a shaft guide 40 attached to tow arm 20. The shaft 38e is connected to tow arm 12 at pivot connection 3a by a pinion 48 in engagement to half crown wheel 27. At the other end, shaft 38e is connected to tow member 16 at pivot connection 4a by a pinion 44 to a gear rack 46.

In use, as trailer 18 is being reversed, and begins to skew or veer off a straight line relative to vehicle 14, the pinion 48 acts on the crown wheel 27 and rotates either clockwise or counter clockwise depending on which side the trailer 18 veers. In this example as shown in FIG. 11, it will be assumed that it is veering to the left with the angle of the trailer 18 changing relative to vehicle 14, tow bar 12 and crown wheel 27. As a result pinion 48 rotates driving the linkage shaft 38e and pinion 44 in a counter clockwise direction. This rotation of pinion 44 in turn drives the rack 46 and therefore tow member 16 to move on its pivot to the left a number of degrees, thereby causing the trailer 18 to be urged back towards the straight line being followed by the vehicle 14.

When it is desired to move the trailer in a forward direction, the pinion 48 is disengaged from crown wheel 27 by a disengagement means (not shown) and the shaft 38e locked to prevent it from rotating by a locking means (now shown). The disengagement means and locking means may be either manually operated or remotely operated by the driver from within the vehicle 14.

Figure 12:
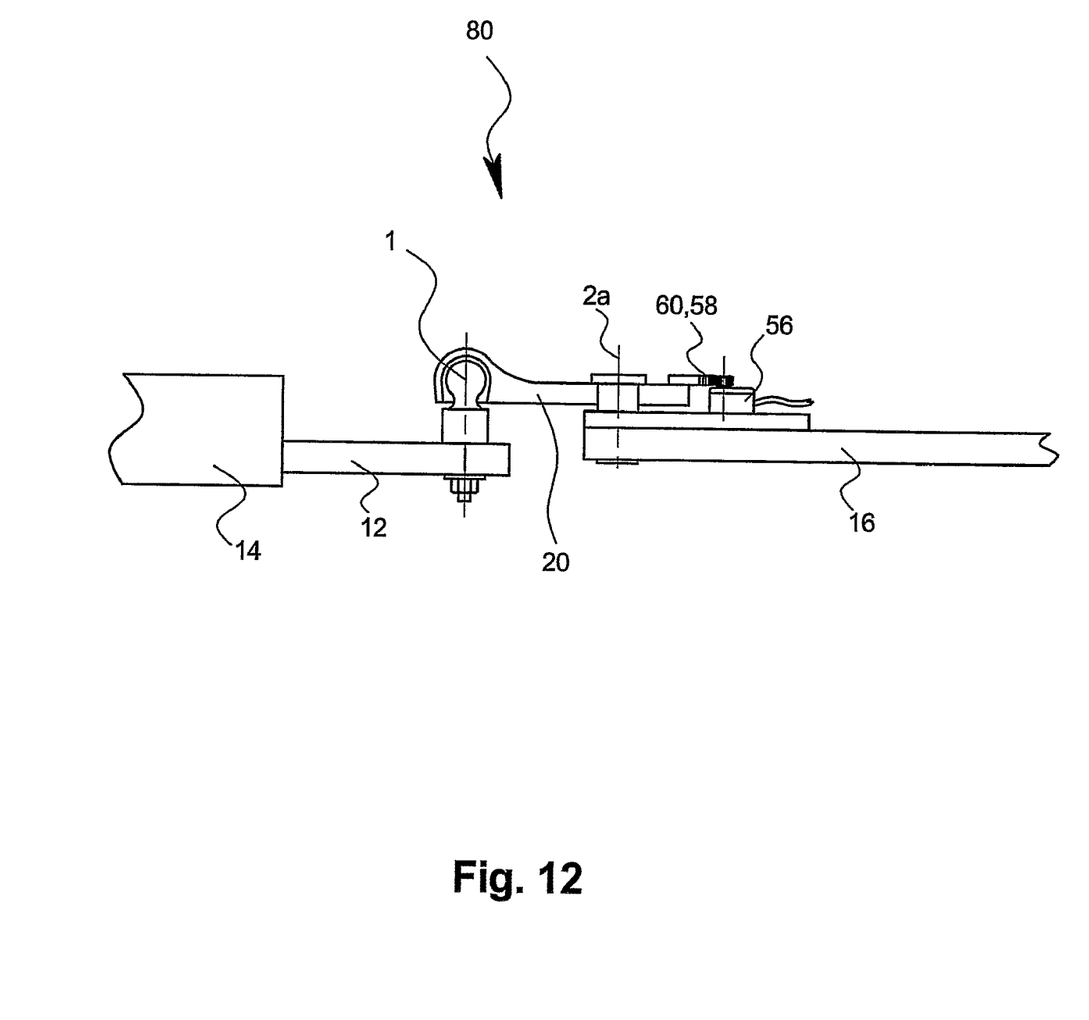
FIG. 12 is an elevation view of a sixth embodiment of a trailer reversal self-correcting assembly of the present invention.
Figure 13:
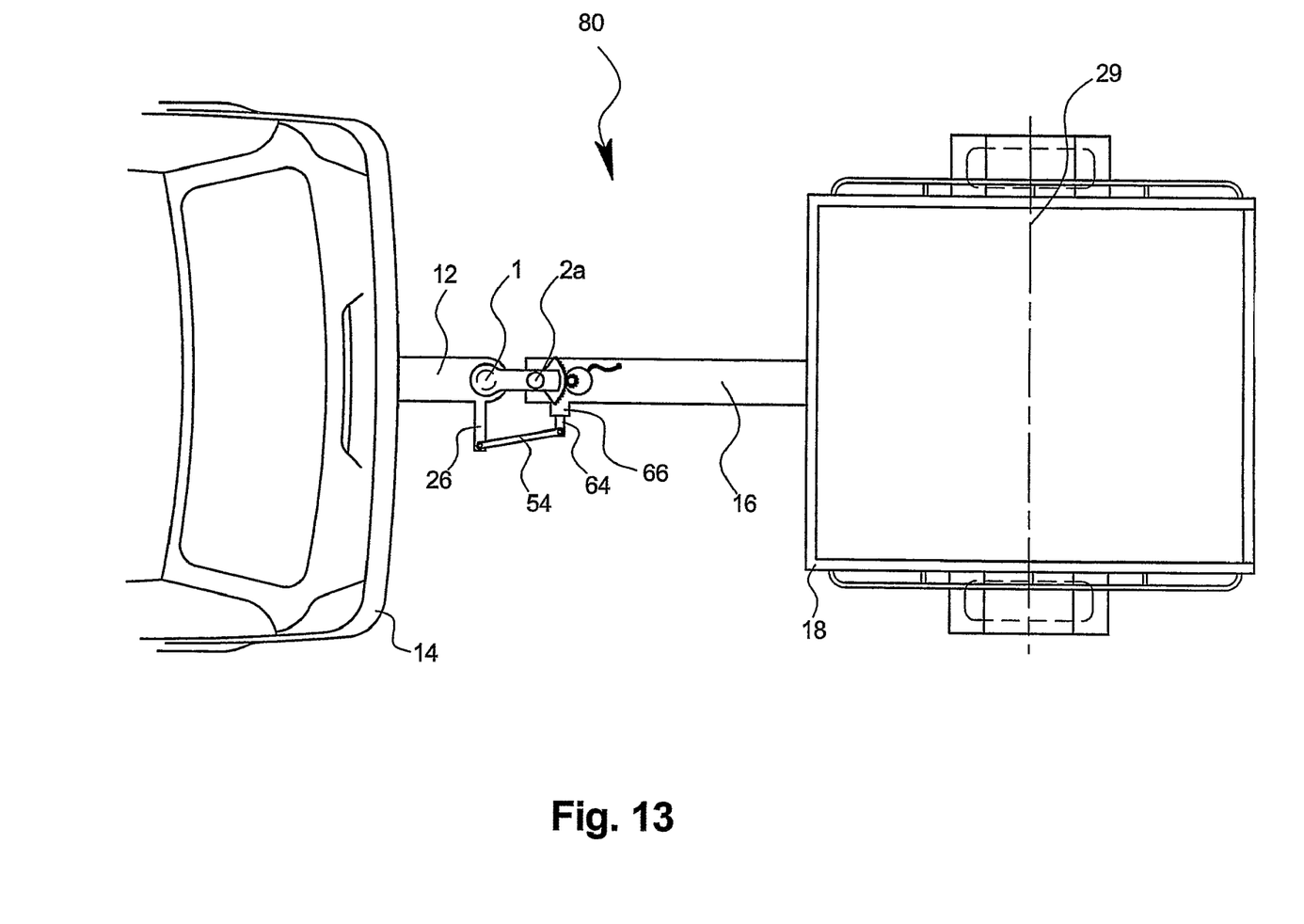
FIG. 13 is a plan view of the assembly shown in FIG. 12 when the trailer is being reversed in a straight line by the vehicle.
Figure 14:
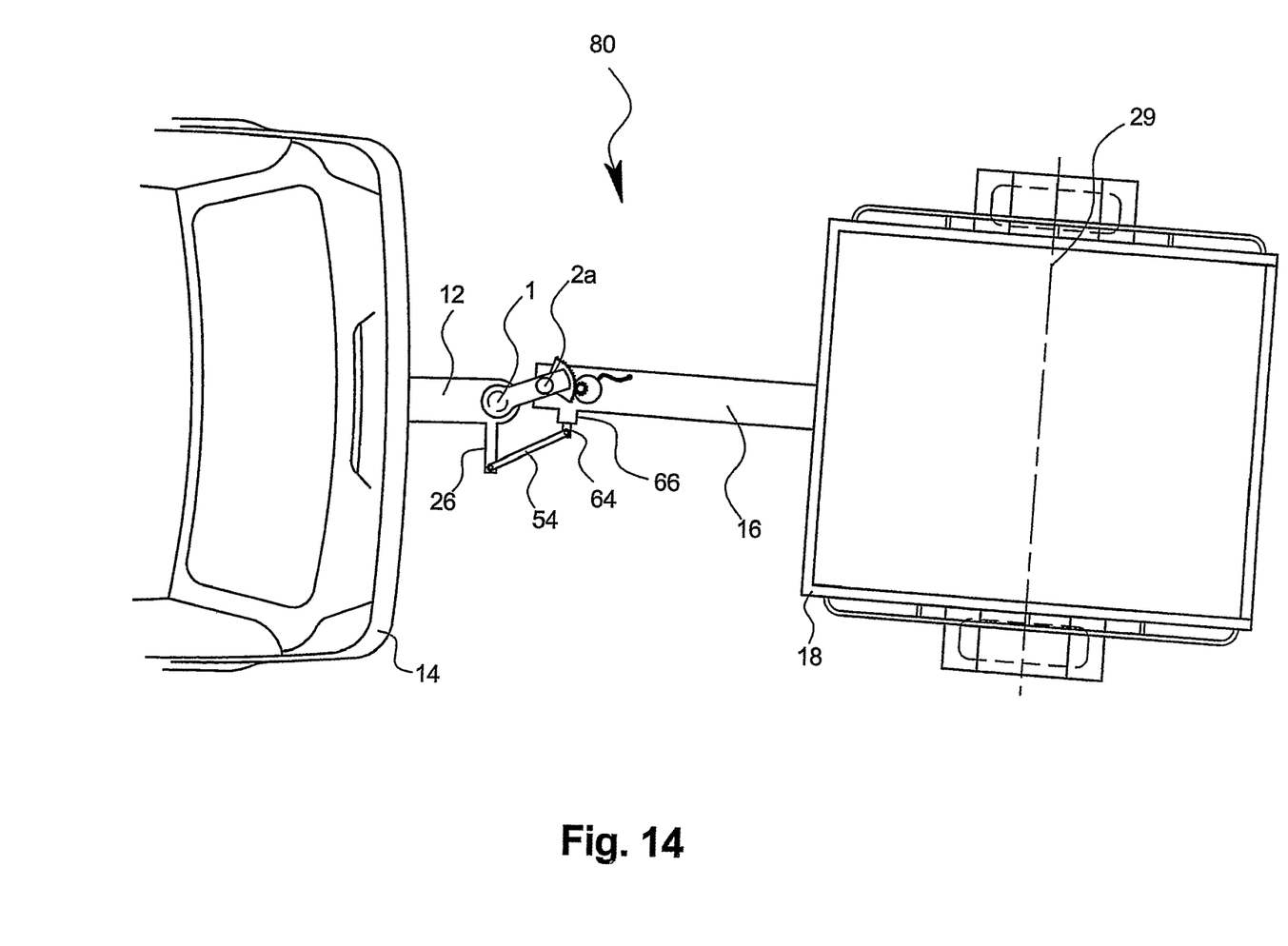
FIG. 14 is a similar view of the assembly shown in FIG. 13 when the trailer is skewed away from a straight line to be followed by the vehicle, which skewing will be self corrected by reversal of the trailer by the vehicle by reversal in a straight line.

FIGS. 12-14 depict a trailer reversal self-correcting assembly 80 of the present invention in a sixth embodiment. The assembly 80 in FIGS. 12-14 has similar features to assembly 10 of the first embodiment (and so similar features in FIGS. 12-14 will be accorded the same numerals as those accorded in FIGS. 1-3). In this embodiment the tow arm 20 is pivotally connected at one free end via pivot connection 1 to the tow ball of tow bar 12. The tow arm 20 is pivotally connected via a pivot connection 2a to tow member 16. The pivot connection 2a is located between pivot connection 1 and the other free end of tow arm 20. An actuator 60 is mounted on tow member 16 via an electric motor 56. A gear 58 is mounted to actuator 60 and is meshed to tow arm 20. The actuator 60 is operably connected to a switch assembly 66 that is activated by a lever 64 pivotally connected to a linkage member 54 that in turn is pivotally connected to an extension mount 26. The linkage member 54, lever 64 and switch assembly 66 have been omitted from FIG. 12 for clarity purposes.

In use, as trailer 18 is being reversed and begins to veer off to one side, the linkage member 54 acts on the lever 64 thereby depressing switch assembly 66 that activates electric motor 56. The gear 58 is moved by electric motor 56 via actuator 60, and in turn moves tow arm 20 to which it is meshed about pivot connection 2a, thereby urging the trailer line of travel back towards the straight line being followed by the vehicle 14.

When it is desired to move the trailer 18 in a forward direction the switch assembly 66 may be rendered inactive by a manual console switch, or a relay switch connected to the transmission of the vehicle 14 or to the reversing lights.

In all of the figures of the abovementioned embodiments, the operation of the trailer reversal self-correcting assembly of the present invention has been shown and described with correcting the line of travel of the reversing trailer 18 such that is back in-line with a vehicle reversing in a substantially straight line. However, it should be appreciated that the present invention operates such that the assembly continually corrects the line of travel of the reversing trailer to the line of travel of the vehicle, regardless of whether the line of travel of the vehicle is straight or not. As such the assembly of the present invention allows for the trailer to be reversed and continually corrected as the vehicle engages a curved line of travel, such as to avoid other vehicles or to back into driveways and the like.

It should also be understood that the various trailer reversal self correcting assemblies of the abovementioned embodiments can be incorporated in purpose built trailers, or can alternatively be provided in kit form for retrofitting existing vehicle/trailer configurations. For example, the extension mounts 26, 26a and 30, 30a may be integral with tow bar 12 and tow member 16, respectively as shown in FIGS. 2-8. Alternatively, these extension mounts 26, 26a and 30, 30a may be retrofitted to a conventional tow bar 12 and tow member 16, respectively.

It should be noted that the assemblies of the above-described embodiments have been depicted in the figures in an enlarged manner such that the invention may be readily understood. However, it should also be understood that the relative size and shape of the components of these assemblies may differ from that depicted. For example, the extension mounts 26, 26a, 30, and 30a of the first and third embodiments may not need to extend as far as that depicted in order to carry out the present invention.

The term "comprising" (and its grammatical variations) as used herein is used in the inclusive sense of "having" or "including" and not in the exclusive sense of "consisting only of".

The invention claimed is:

1. A trailer reversal self correcting assembly adapted to be disposed between the tow bar of a vehicle and the tow member of a trailer, said assembly comprising: (a) a tow arm pivotally connected at or near its first end to said tow bar at a first pivot connection and also pivotally connected at or near its second end to said tow member at a second pivot connection, said second pivot connection lies on a first axis of said tow member; (b) a first extension mount extends laterally from said tow bar and a second extension mount extends laterally from and in fixed relation to said tow member to the same side as the first extension mount; (c) a first correcting linkage device having at least a first linkage member connected between said first extension mount at a third pivot connection and said second extension mount via a fourth pivot connection, said third pivot connection lies on a second axis that intersects with said first axis at a location behind said tow arm.

2. A trailer reversal self correcting assembly as claimed in claim 1, wherein upon reversal of said trailer by said vehicle, movement of said trailer away from a straight line followed by the vehicle is self-corrected by forces applied by said first correcting linkage device on the linkage provided by said tow arm.

3. A trailer reversal self correcting assembly as claimed in claim 1, wherein a third extension mount extends laterally from said tow bar opposite said first extension mount, and a fourth extension mount extends laterally from said tow member to the same side as the third extension mount, and a second correcting linkage device having at least a second linkage member is connected between said third extension mount at a fifth pivot connection and said fourth extension mount via a sixth pivot connection, said fifth pivot connection lies on a third axis that intersects with said first axis at a location behind said tow arm.

4. A trailer reversal self correcting assembly as claimed in claim 3, wherein upon reversal of said trailer by said vehicle, movement of said trailer away from a straight line followed by the vehicle is self-corrected by forces applied by said first and second correcting linkage devices upon each other.

5. A trailer reversal self correcting assembly as claimed in claim 1, wherein an axle of said trailer is disposed between said tow arm and the intersection of said first axis and said second axis.

6. A trailer reversal self correcting assembly as claimed in claim 3, wherein an axle of said trailer is disposed between said tow arm and the intersection of said first axis and said third axis.

7. A trailer reversal self correcting assembly as claimed in claim 1, wherein said first correcting linkage device comprises a plurality of linkage members.

8. A trailer reversal self correcting assembly as claimed in claim 3, wherein said first correcting linkage device and said second correcting linkage device each comprise a plurality of members.

9. A trailer reversal self correcting assembly as claimed in claim 1, wherein said first linkage member is length adjustable.

10. A trailer reversal self correcting assembly as claimed in claim 1, wherein said first linkage member is a pneumatic strut.

11. A trailer reversal self correcting assembly as claimed in claim 1, wherein said pivot connections are pivot bolt and nut arrangements.

12. A trailer reversal self correcting assembly as claimed in claim 1, wherein said assembly is provided with a powered drive unit and/or powered actuators to assist said trailer to be self corrected when said trailer moves away from a straight line followed by said vehicle.

* * * * *